US012458975B1

(12) United States Patent
Iafrate

(10) Patent No.: US 12,458,975 B1
(45) Date of Patent: Nov. 4, 2025

(54) SYSTEM AND METHOD FOR DUAL ROLLER CRUSHING

(71) Applicant: John A. Iafrate, Apopka, FL (US)

(72) Inventor: John A. Iafrate, Apopka, FL (US)

( * ) Notice: Subject to any disclaimer, the term of this patent is extended or adjusted under 35 U.S.C. 154(b) by 0 days.

(21) Appl. No.: 18/621,965

(22) Filed: Mar. 29, 2024

(51) Int. Cl.

| | |
|---|---|
| ***B02C 1/08*** | (2006.01) |
| ***B02C 1/02*** | (2006.01) |
| ***B02C 1/06*** | (2006.01) |
| ***B02C 1/10*** | (2006.01) |
| ***B02C 23/02*** | (2006.01) |

(52) U.S. Cl.
CPC .................. *B02C 1/08* (2013.01); *B02C 1/02* (2013.01); *B02C 1/06* (2013.01); *B02C 1/10* (2013.01); *B02C 23/02* (2013.01)

(58) Field of Classification Search
CPC .... B02C 1/02; B02C 1/08; B02C 1/10; B02C 1/06
See application file for complete search history.

(56) References Cited

U.S. PATENT DOCUMENTS

| | | | | |
|---|---|---|---|---|
| 586,381 A * | 7/1897 | Davis | B02C 1/08 | 241/242 |
| 646,516 A * | 4/1900 | Brown | B02C 1/06 | 241/291 |
| 1,946,763 A * | 2/1934 | Sallwasser | B02C 1/08 | 241/32 |
| 2,028,643 A | 1/1936 | Bakstad | | |
| 2,161,573 A * | 6/1939 | Henry | B02C 1/08 | 241/218 |
| 2,204,024 A * | 6/1940 | Meinhardt | B02C 1/06 | 241/291 |
| 2,582,734 A * | 1/1952 | Adams | B02C 1/08 | 241/242 |
| 2,781,980 A * | 2/1957 | Ferguson | B02C 1/08 | 241/294 |
| 5,248,100 A | 9/1993 | Arakawa | | |
| 6,446,892 B1 | 9/2002 | Fasoli et al. | | |

(Continued)

FOREIGN PATENT DOCUMENTS

| | | |
|---|---|---|
| CN | 107469909 | 12/2017 |
| CN | 109201173 | 1/2019 |

(Continued)

*Primary Examiner* — Mohammed S. Alawadi
(74) *Attorney, Agent, or Firm* — Terry M. Sanks, Esq.; Beusse Sanks, PLLC

(57) ABSTRACT

A crusher device includes a jaw having a center block assembly with a first crushing jaw having surface on a first vertical side and a second crushing jaw having a surface on a second vertical side of the center block assembly wherein each surface has a diametrically-opposing arcuate plate surface, a first dual non-overlapping crushing roller mounted in space relation from the diametrically-opposing arcuate plate surface, a second dual non-overlapping crushing roller mounted in space relation from the diametrically-opposing arcuate plate and a toggle mechanism coupled to the center block assembly to create a toggling motion during a toggle cycle to move the center block assembly, which causes the center block assembly to, from a starting location, move in a first direction toward a first roller of the first jaw crushing channel, reach an end of the first direction, and subsequently return to the starting location.

19 Claims, 6 Drawing Sheets

(56) References Cited

U.S. PATENT DOCUMENTS

| | | | | |
|---|---|---|---|---|
| 7,448,564 | B2 * | 11/2008 | Niemela | B02C 4/12 241/101.2 |
| 8,702,024 | B2 * | 4/2014 | Iafrate | B02C 1/08 241/266 |
| 2007/0029422 | A1 | 2/2007 | Niemela et al. | |

FOREIGN PATENT DOCUMENTS

| | | | | |
|---|---|---|---|---|
| CN | 111774147 | | 10/2020 | |
| CN | 111774147 | A * | 10/2020 | B02C 4/12 |
| CN | 112121914 | | 12/2020 | |
| CN | 113413946 | | 9/2021 | |
| DE | 102022125159 | A1 * | 4/2024 | B02C 4/12 |
| DE | 102022130837 | A1 * | 5/2024 | B02C 4/12 |

* cited by examiner

SYSTEM AND METHOD FOR DUAL ROLLER CRUSHING

BACKGROUND

Embodiments relate to system and method for crushing frangible material.

BRIEF SUMMARY

Embodiments relate to a system and method for crushing frangible material in jaws that include counter rotating rollers and toggling arcuate plate surfaces. An embodiment of a crusher device comprising a hopper having an inlet and two outlets and a jaw having dual-crushing channels. The dual-crushing channels have a first crushing jaw and a second crushing jaw in space relation fed by the hopper. The jaw includes diametrically-opposing arcuate plate surfaces. The device includes a center block assembly having a quasi-X shape including lateral sides that provide the diametrically-opposing arcuate plate surfaces and diametrically-opposing medial surfaces. Dual non-overlapping crushing rollers are mounted in space relation from the diametrically-opposing arcuate plate surfaces that together form a first roller and arcuate plate surface (R APS) pair having a first distance therebetween to form a first jaw crushing channel and a second roller and arcuate plate surface (R&APS) pair having a second distance therebetween to form a second jaw crushing channel. The device includes a center block assembly having a quasi-X shape including lateral sides that provide the diametrically-opposing arcuate plate surfaces and diametrically-opposing medial surfaces. The device includes a toggle mechanism coupled to the center block assembly and has a toggling motion during a toggle cycle to move the center block assembly, which causes the center block assembly to, from a starting location, move in a first direction toward a first roller of the first jaw crushing channel, reach an end of the first direction, and subsequently return to the starting location.

In one aspect, a method includes funneling frangible material to a hopper having an inlet and two outlets and receiving the frangible material by at least one crushing jaw of dual-crushing jaws. The crushing jaws include dual non-overlapping crushing rollers, and diametrically-opposing arcuate plate surfaces. Each roller and arcuate plate surface pair forms a crushing jaw, each crushing jaw being with a jaw crushing channel fed by a respective outlet of the two outlets. The method includes toggling a toggling center block assembly with the diametrically-opposing arcuate plate surfaces over a toggle cycle and during the toggle cycle, causing a toggling motion of a toggle mechanism to move the center block assembly. This causes the center block assembly to, from a starting location, move in a first direction toward a first roller of a first crushing jaw, reach an end of the first direction, and subsequently return to the starting location.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
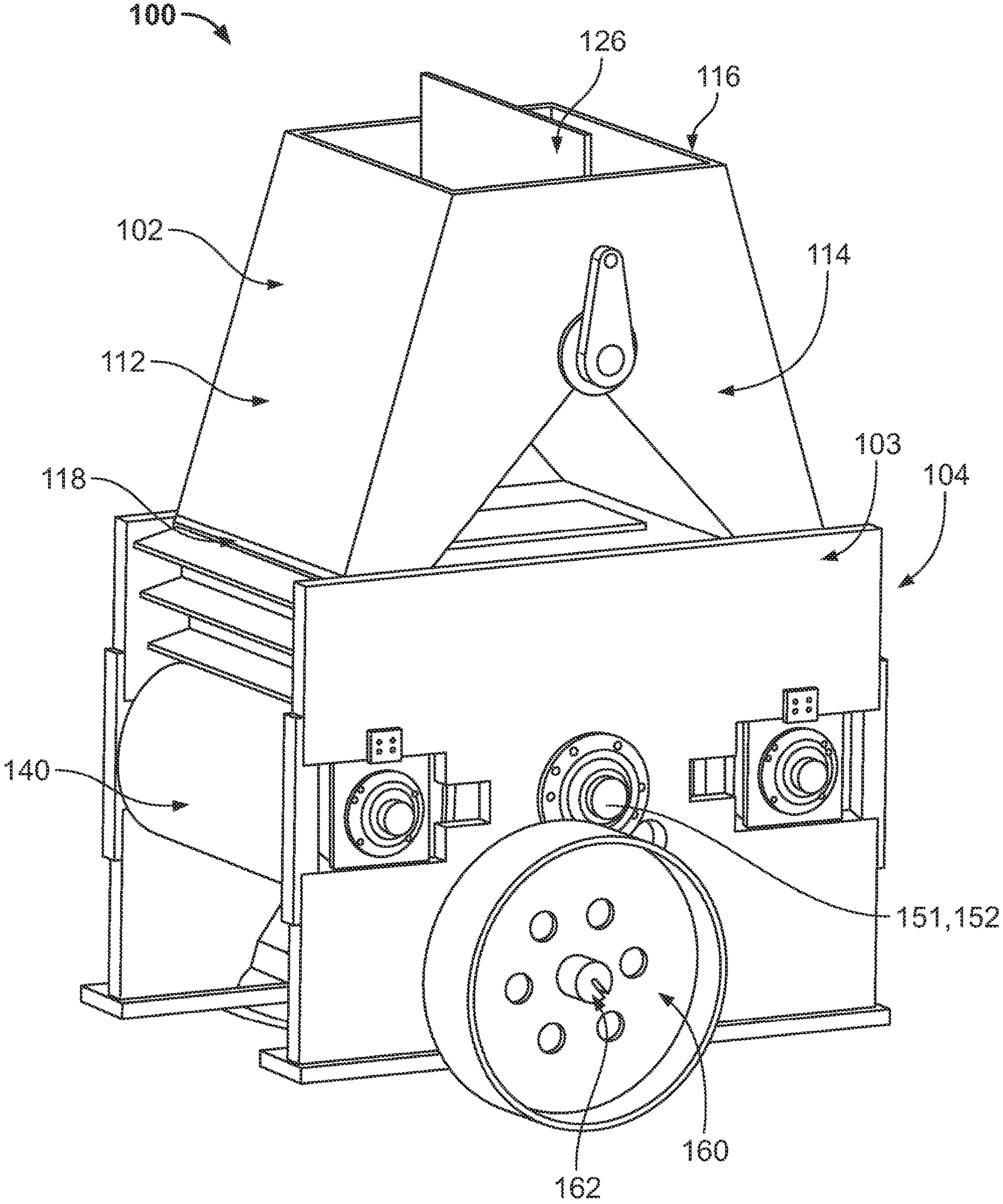
FIG. 1 illustrates a perspective view of a crusher device in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments of the crusher device 100 will be described in relation to FIGS. 1-5. The crusher device 100 may crush frangible material that includes rock, granite, hard material, sandstone, coal, shells, and the like. The crusher device 100 includes a jaw, toggling center block assembly or crushing jaw, 150 having dual-crushing channels. The dual-crushing channels have a first crushing jaw 140A and a second crushing jaw 140B in space relation fed by the hopper.

Each jaw has a narrowing jaw path which is further narrowed by toggling motion of the toggling center block assembly 150 that toggles the arcuate plate surfaces closer to its paired roller in a toggle cycle or stroke.

Referring now to FIG. 1, a perspective view of a crusher device 100 in accordance with one embodiment is illustrated. The crusher device 100 may include a hopper 102 and a crusher chamber 104. The crusher chamber 104 may be below the hopper 102 where gravity assists in the movement of material through the hopper 102 and into the crusher chamber 104. The crusher chamber 104 may crush frangible material, for example using side-by-side crushing rollers 140 as disclosed in further detail below. The crusher device 100 may include a flywheel 160. A center of the flywheel 160 may be coupled to an eccentric shaft 162.

The hopper 102 may include side walls 112 forming an enclosure. The top of the side walls 112 may include an inlet 116 to receive the material to be crushed in the crusher chamber 104. The side walls 112 gradually taper from the inlet 116 to a bottom end 118 of the side walls 112 such that the area bound by the side walls 112 expands.

Figure 2:
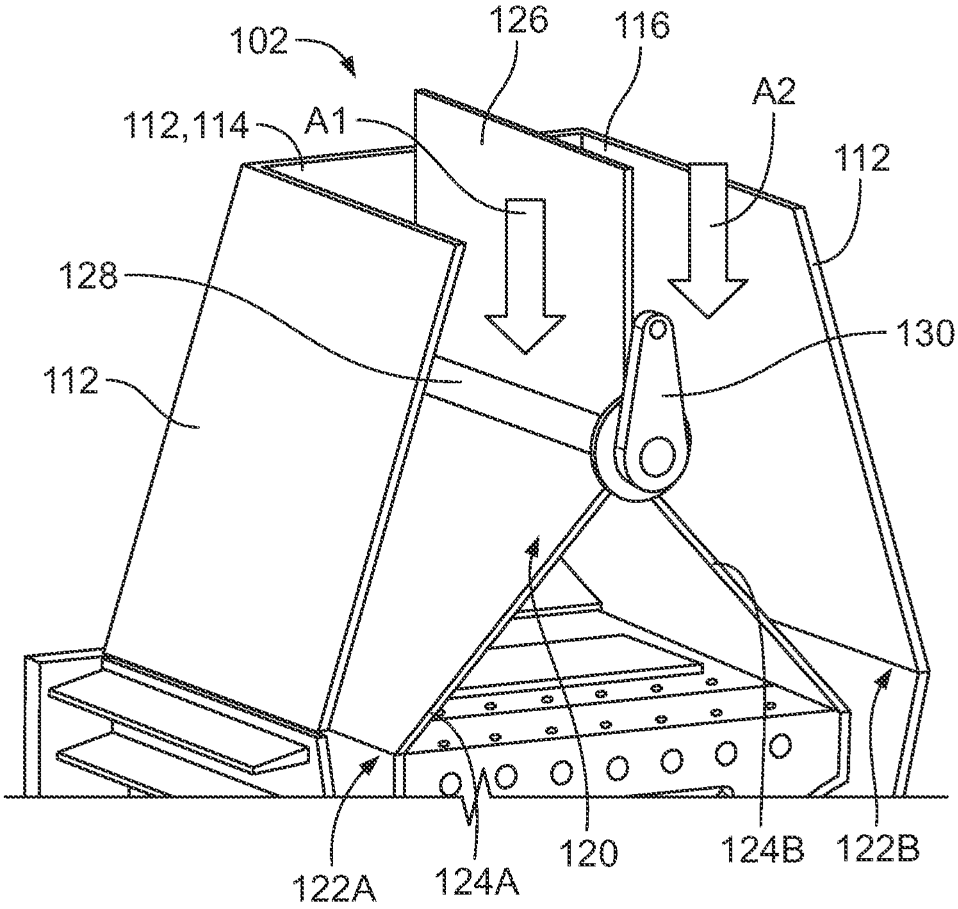
FIG. 2 illustrates an interior view of a hopper of the crusher device in accordance with one embodiment.

Referring also to FIG. 2, an interior view of a hopper 102 of the crusher device 100 in accordance with one embodiment is illustrated. The hopper 102 may include a material diverter 120 within and supported by the enclosure of the hopper 102. The material diverter 120 diverts the material to be crushed to outlets 122A and 122B. The material diverter 120 may include a first sloped surface 124A sloped from the material diverter 120 in the direction of outlet 122A and a second sloped surface 124B sloped from the material diverter 120 in the direction of outlet 122B. The first sloped surface 124A and the second sloped surface 124B may form an inverted V-shaped structure to slide and direct material to top inlets of the crusher chamber 104.

The material diverter 120 may include a moving feed plate 126. The feed plate 126 may be coupled to a rotating shaft 128. In some embodiments, the rotating shaft 128 may be coupled to two opposing side walls 114 of side walls 112. A direction indicator 130 may be provided on the exterior side of one of the opposing side walls 114.

In operation, the material that enters hopper inlet 116 and depending on the position of feed plate 126, the material is funneled to one of: outlet 122A, outlet 122B or both outlets 122A and 122B. In the illustration, the feed plate 126 is perpendicular to a vertical plane. In this orientation, frangible material may flow along the paths of arrows A1 and A2 to outlets 122A and 122B. Specifically, the outlets 122A and 122B may be elongated slots.

When the feed plate 126 is rotated toward a first side of the hopper 102 (toward outlet 122A), the path of arrow A1 may be closed off from receiving material. This allows the material entering the inlet 116 to follow the path of arrow A2 to the outlet 122B. Alternately, when the feed plate 126 is rotated to a second side of the hopper 102 (toward outlet 122A), the path of arrow A2 may be closed off from receiving material. This allows the material entering the inlet 116 to follow the path of arrow A1 to the outlet 122A.

The hopper 102 may include a controlled input feed of the material through controlled baffle wall (i.e., feed plate 126) closing and opening paths to one or the other of the rollers 140. In the design, material to be broken or crushed is fed into at least one elongated slot or outlet at a location about the top of at least one arcuate breaker plate. The hopper 102 may allow gravity to feed and direct the material along a sloped surface into the crusher chamber 104.

Figure 3:
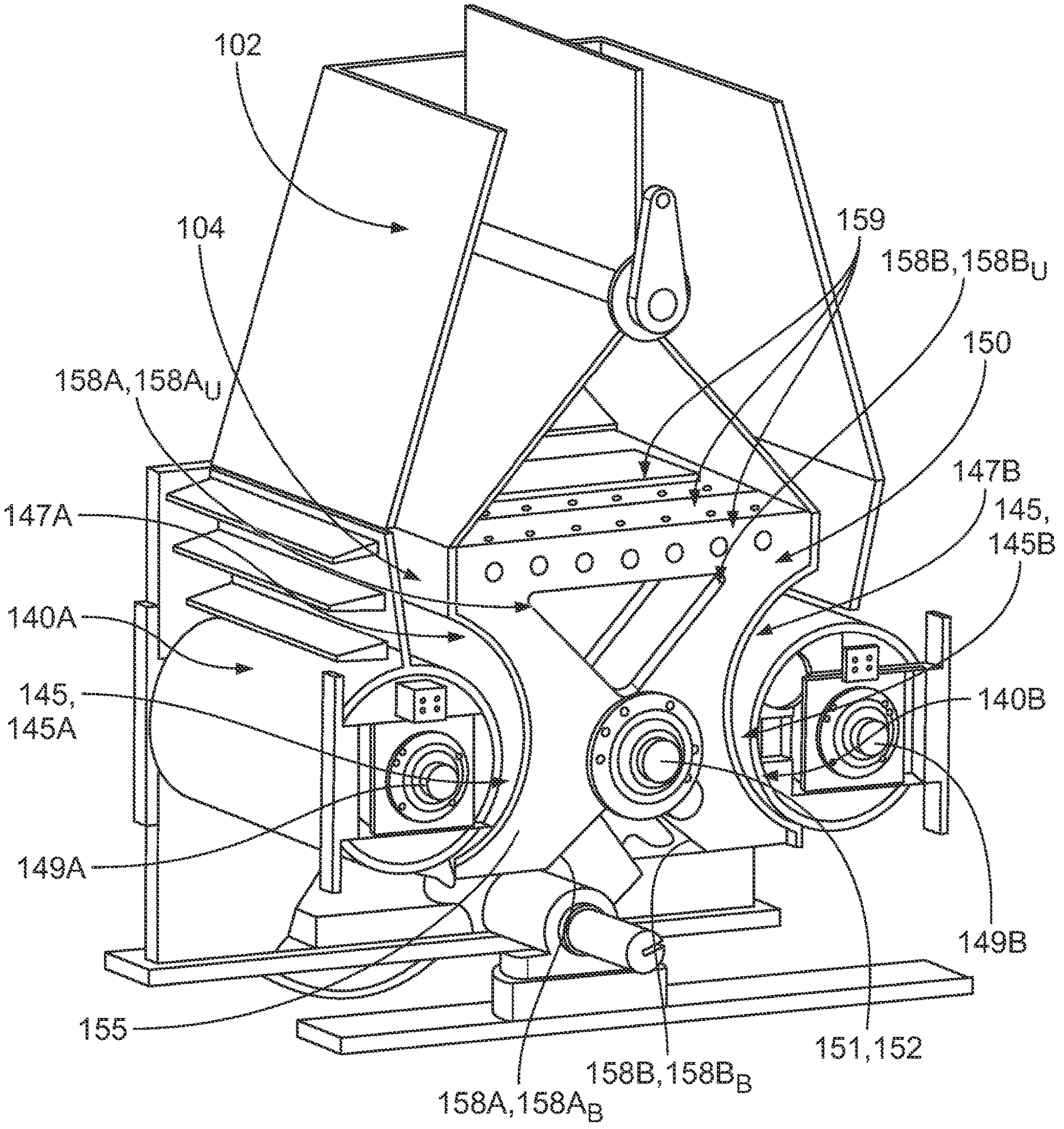
FIG. 3 illustrates a perspective view of a crusher device with a side wall of the housing removed in accordance with one embodiment.
Figure 4:
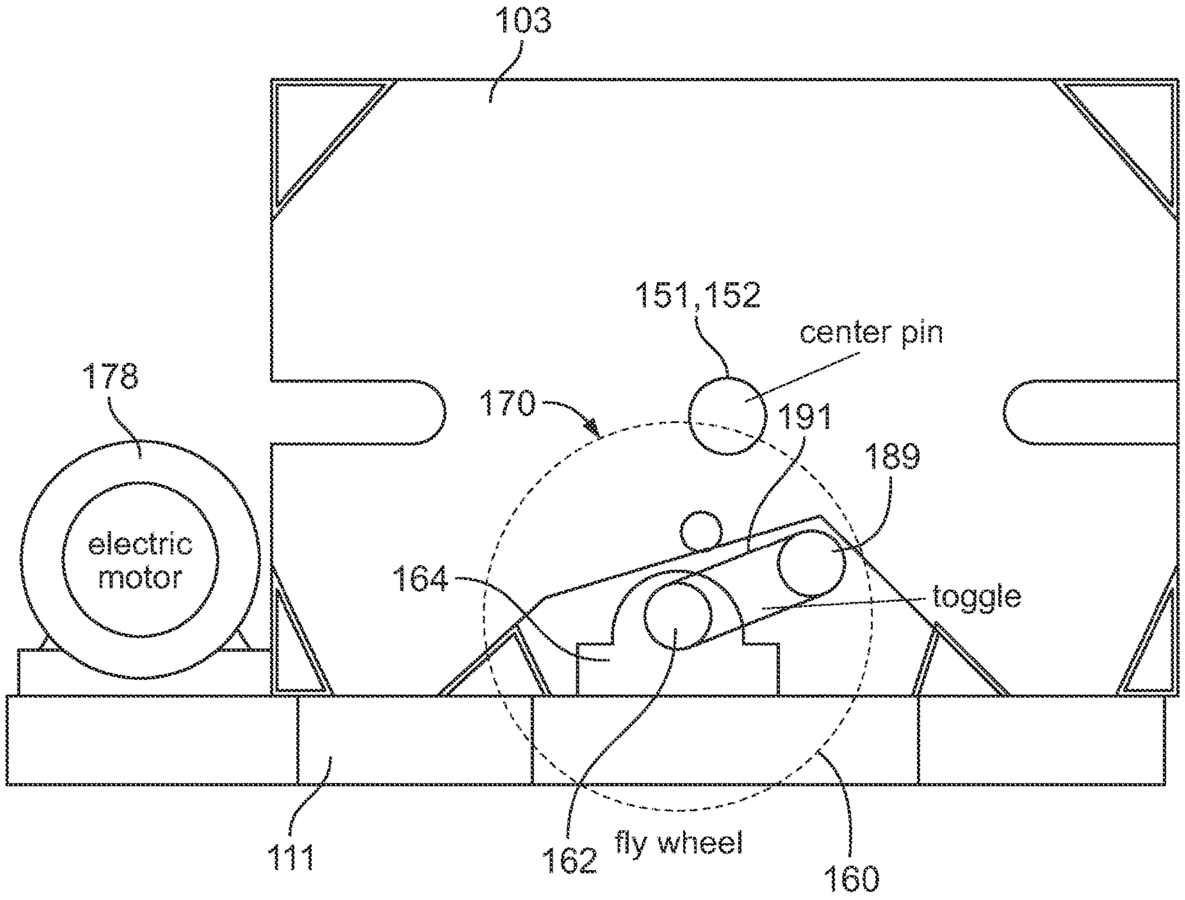
FIG. 4 illustrates a diagram of the flywheel and toggle mechanism in accordance with one embodiment.
Figure 5:
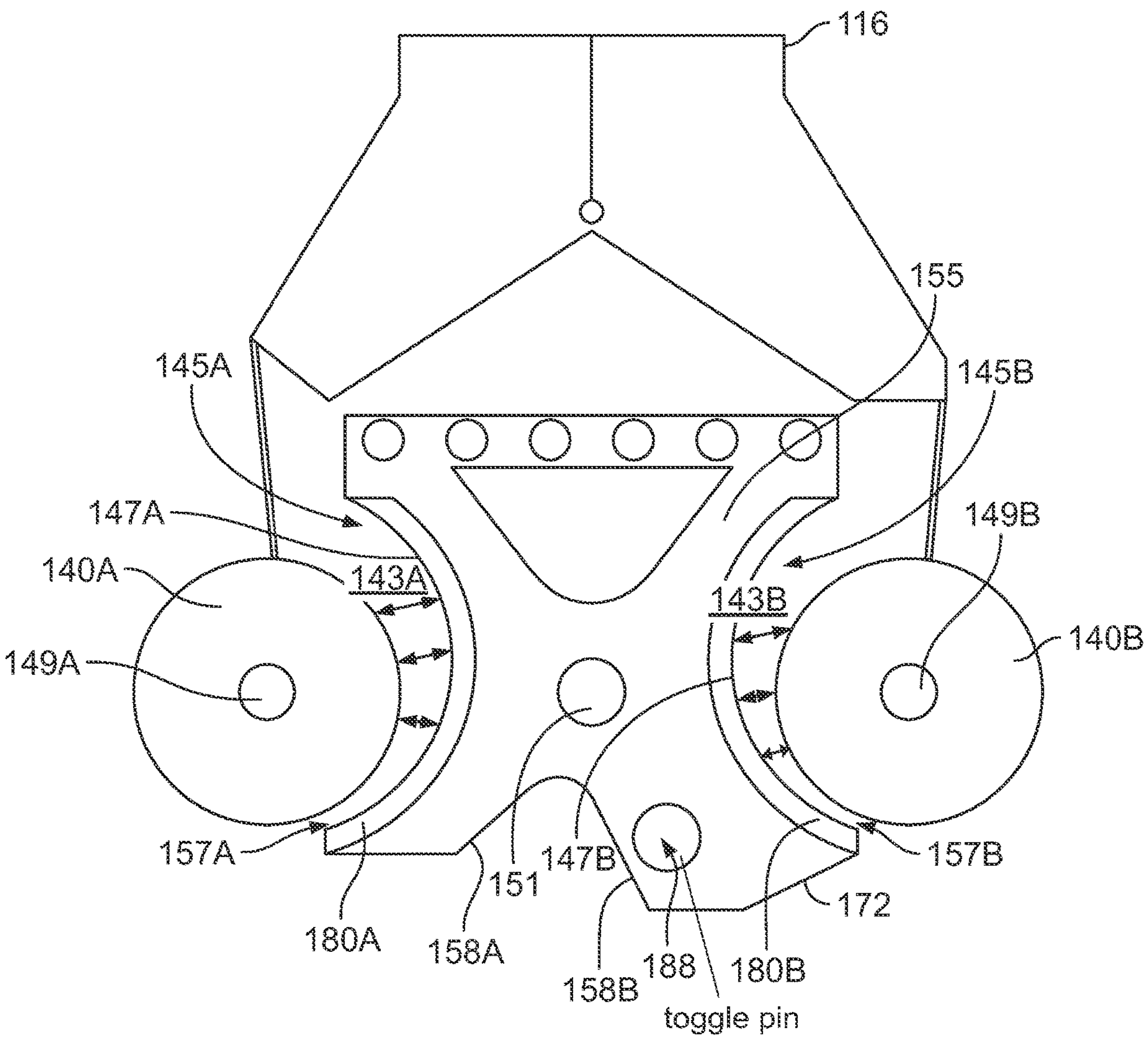
FIG. 5 illustrates an end view of an interior of the crusher device being offset in accordance with one embodiment.

The details of the crusher chamber 104 will not be described in relation to FIGS. 3-5. FIG. 3 illustrates a perspective view of a crusher device 100 with a side wall of the housing 103 removed in accordance with one embodiment. FIG. 4 illustrates a diagram of the toggle mechanism 170, a diagram of the flywheel 160 in accordance with one embodiment. FIG. 5 illustrates an end view of an interior of the crusher device being offset in accordance with one embodiment.

The crusher 100 includes dual-crushing jaws 145 on a single jaw 150, each having a first crushing jaw 145A and a second crushing jaw 145B in space relation fed by the hopper 102. The hopper's feed channels feed the dual crushing jaws. Each feed channel including a feed plate sloped in a direction toward an opening of each of the first and second crushing jaws.

Each dual-crushing jaw 145 includes diametrically-opposing arcuate plate surfaces 147A, 147B that interact with dual non-overlapping crushing rollers 140A, 140B. Specifically, the first crushing jaw 145A includes arcuate plate surfaces 147A, first roller 140A and the channel therebetween. The second crushing jaw 145B includes arcuate plate surfaces 147B, second roller 140B and the channel therebetween.

First roller 140A rotates about roller shaft 149A. Second roller 140B rotates about roller shaft 149A. The first roller 140A and the second roller 140B rotate in opposing directions. The dual non-overlapping crushing rollers 140A, 140B may be mounted in space relation from the diametrically-opposing arcuate plate surfaces 147A, 147B of the jaw 150 that together form a first roller and arcuate plate surface (R&APS) pair 140A with 147A having a first distance therebetween to form a first jaw crushing channel 143A and a second roller and arcuate plate surface (R&APS) pair 140B and 147B having a second distance therebetween to form a second jaw crushing channel 143B. As shown in FIG. 5, the double sided arrows between arcuate plate surfaces 147A and roller 140A and the double sided arrows between arcuate plate surfaces 147B and roller 140A denotes the channels 143A, 143B and the distances.

The crusher 100 includes a toggling center block assembly 150 includes one or more quasi-X shape baffles 150. Each quasi-X shape baffle 150 including lateral sides 157A, 157B that provides the diametrically-opposing arcuate plate surfaces 147A, 147B and diametrically-opposing medial surfaces 158A, 158B. The medial surface 158A includes an upper medial surface 158Au and bottom medial surface 158AB. The medial surface 158B includes an upper medial surface 158Bu and bottom medial surface 158BB. The arcuate plate surfaces 147A, 147B may be a single piece of material that is affixed to one or more quasi-X shape baffles 150, creating a single jaw 150. The jaw 150 includes a center hole 151 that receives a block shaft 152. The center hole 151 may provide a center axis that extends along the block shaft 152. The block shaft 152 may be configured to rotate, however, it is constrained by the toggle pin 189 (FIG. 4). As a result, the block shaft 152 provides a flexible connection between all of the quasi-X shaped baffles 150 or jaw 150*d.*

A first lateral side 157A of the quasi-X shaped baffles 15 are joined together by a first arcuate plate surface 180A of the arcuate plate surface 147A. A second lateral side 157B of the quasi-X shaped baffles 150 are joined together by a second arcuate plate surface 180B of the arcuate plate surface 147B. Upper medial surfaces 158Au and 158Bu of each quasi-X shaped baffle 150 are joined together by a corresponding one support crossbar 159. The quasi-X shaped baffles 150 include a toggle pin hole 188, which receives a toggle pin 189 (FIG. 4).

The support crossbar 159 may extend through the medial sides to the lateral sides such that the inlet to the jaws 145 has a generally linear (vertical) surface that feeds into the jaw having the arcuate surface 147A or 147B.

With reference to FIG. 4, the crusher device 100 includes a toggle mechanism 170 coupled to the jaw 150. The toggle mechanism 170 includes the toggle pin 189 coupled to jaw 150, which comprises all of the quasi-X shaped baffles 150 so that the baffles 150 move in unison. In an embodiment the jaw 150 may be a singular piece instead of comprising a plurality of quasi-X shaped baffles. The toggle mechanism 170 may include an eccentric shaft 162, toggle 191 and toggle pin 189. The eccentric shaft 162 is mounted via a pillar block bearing 164 to a base 111 of the housing 103.

The toggle pin 189 may be coupled to the eccentric shaft 162 to drive the toggle arm 191. The eccentric shaft 162 is driven by motor 178. The jaw 172 may be coupled to the eccentric shaft 162 and offset in a direction toward a median surface 158A (i.e., bottom (lower) median surface 158AB) of the first crushing jaw. The eccentric shaft 162 moves the jaw 172 in the first direction to apply a force to a lower medial surface 147A in proximity to a first side of the crushing jaw 172 as the toggle mechanism 170 moves in the first direction. The force is in the direction of the first roller 140A and slightly upward.

The toggle mechanism 170 has a toggling motion during a toggle cycle. The toggling motion moves the center block assembly, jaw or crushing jaw, 172, which causes the center block assembly 150 to, from a starting location, move in a first direction toward a first roller 140A of the first jaw crushing channel 143A, reach an end of the first direction, and subsequently return to the starting location. Therefore, the end of the second direction may be a first offset starting location where the assembly begins a return path to the initial starting location and then back in a second direction, described below.

The device 100 includes the housing 103 to house at least the dual-crushing jaws 145 of the jaw 172, the toggling center block assembly 150 and the toggle mechanism 170.

The illustration of FIG. 5 shows the center block assembly 150 moved in the first direction toward the first roller 140A. For the sake of illustration, the starting location varies. The crusher device 100 may generally center the center block assembly 150 so that the opening (i.e., distances of the channels 143A and 143B) between a roller and an arcuate plate surface are essentially the same, although tapering from the inlet of the channel to the outlet of the channel.

The first distance of the first roller and arcuate plate surface (R&APS) pair 140A, 147A varies along an arc of the first jaw crushing channel 143A, as seen in FIG. 5. The second distance of the second roller and arcuate plate surface (R&APS) pair 140B, 147B varies along an arc of the second jaw crushing channel 143B. The starting location may include an initial starting location which corresponds to the location when both the arc around the first jaw crushing channel 143A and the arc the second jaw crushing channel 143B are substantially the same, meaning the distances between the first roller 140A and the arcuate plate surface 147A are approximately the same as the distances between the second roller 140B and the arcuate plate surface 147B.

In the illustration of FIG. 5, the toggle mechanism 170 has moved in the first direction. However, the toggle mechanism 170 then moves the center block assembly 150 from a starting location in a second direction. This starting location is a first offset starting location which corresponds to the end of the toggling motion by toggle mechanism 170 in the first direction. As the toggle mechanism 170 moves the center block assembly 150 in the first direction, the center block assembly 150 causes both an increase in the first distance at an upper portion of the first jaw crushing channel relative to the first roller 140A and a decrease in the first distance at a bottom end of the first jaw crushing channel 143A relative to the first roller 140A, as seen in FIG. 5.

As the toggle mechanism 170 moves the center block assembly 150 in the first direction, the center block assembly 150 further to simultaneously cause an increase in the second distance at a bottom end of the second jaw crushing channel 143A relative to the second roller 140B.

The crusher device 100 has two toggle cycles. The toggling motion by the toggle mechanism 170 during a second toggle cycle to move the center block assembly 150 causes the center block assembly 150 to, from the starting location, move the center block assembly 150 toward a second roller of the second jaw crushing channel, reach an end of the second direction, and subsequently return to the starting location. The toggling motion is essentially continuous. Therefore, the end of the second direction may be a second offset starting location where the assembly begins a return path to the initial starting location and then back in the first direction.

As the toggle mechanism 170 moves the assembly 150 in the second direction, the assembly 150 causes both an increase in the second distance at an upper portion of the first jaw crushing channel relative to the second roller and a decrease in the second distance at a bottom end of the second jaw crushing channel relative to the second roller. As the toggle mechanism 170 moves the assembly 150 in the second direction, the assembly 150 further to simultaneously cause an increase in the first distance at a bottom end of the first jaw crushing channel relative to the first roller 140A.

Figure 6:
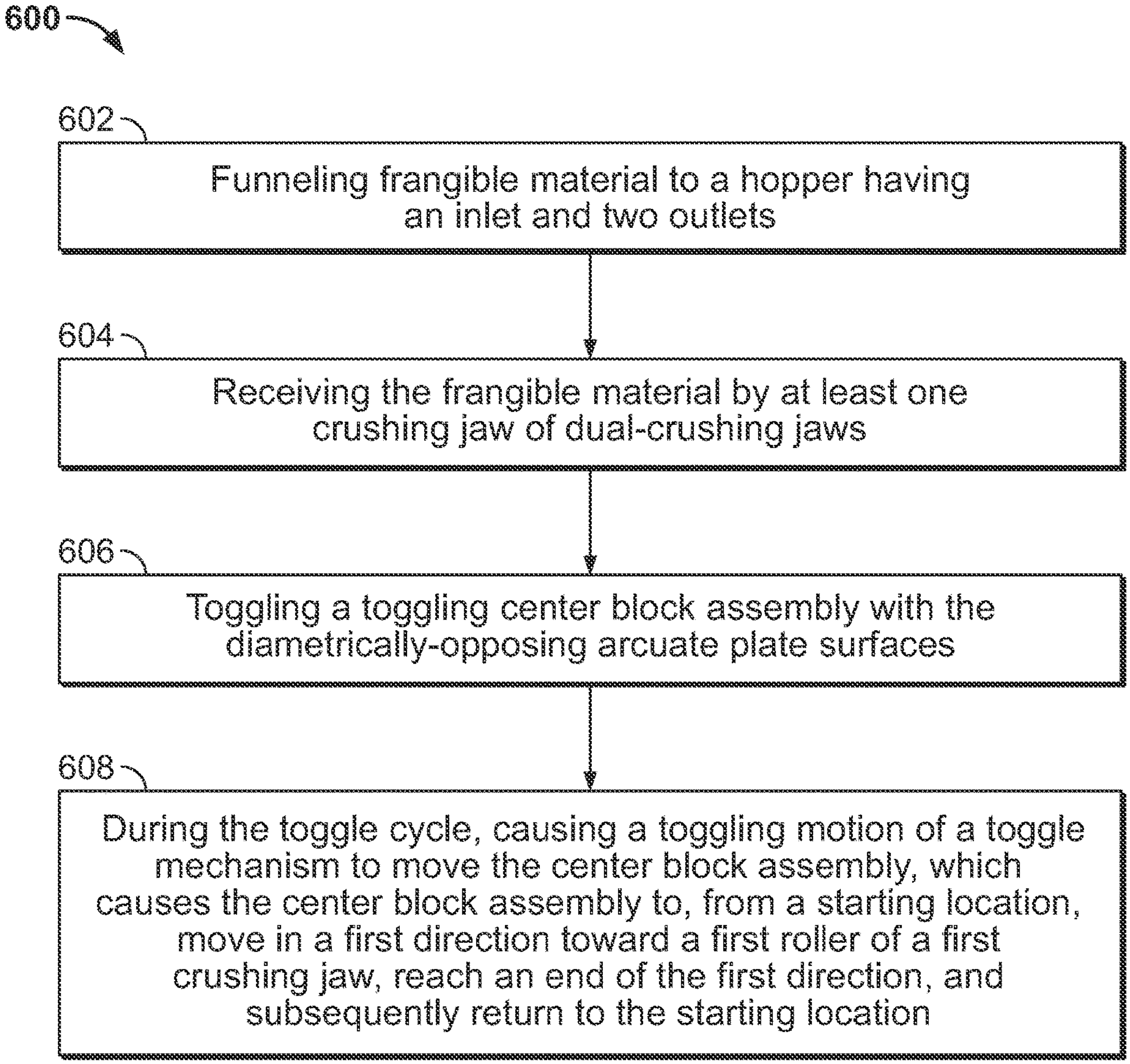
FIG. 6 illustrates a method of crushing frangible material in accordance with one embodiment.

FIG. 6 illustrates a method 600 of a crushing frangible material in accordance with one embodiment. The method may be performed in the order shown or a different order. One or more of the steps may be performed contemporaneously. One or more steps may be omitted or steps added.

The method 600 may include, at block 602, funneling frangible material to a hopper 102 having an inlet and two outlets. At block 604, the method may include receiving the frangible material by at least one crushing jaw of dual-crushing jaws that are part of the jaw 172. The crushing jaws include dual non-overlapping crushing rollers 140A, 140B, and diametrically-opposing arcuate plate surfaces 147A, 147B, each roller and arcuate plate surface pair forms a crushing jaw. Each crushing jaw has a jaw crushing channel fed by a respective outlet of the two outlets.

At block 606, the method may include toggling a toggling center block assembly 150 with the diametrically-opposing arcuate plate surfaces over a toggle cycle. At block 608, the method 600 may include during the toggle cycle, causing a toggling motion of a toggle mechanism 170 to move the center block assembly 150, which causes the center block assembly 150 to, from a starting location, move in a first direction toward a first roller 140A of a first crushing jaw, reach an end of the first direction, and subsequently return to the starting location.

The method may include during the toggle cycle of block 608, as the toggle mechanism 170 moves the assembly 150 in the first direction, causing by the assembly 150 both an increase in a first distance at an upper portion of a first jaw crushing channel relative to the first roller 140A and a decrease in the first distance at a bottom end of the first jaw crushing channel relative to the first roller 140A. The method may include during the toggle cycle of block 608, as the toggle mechanism 170 moves the assembly 150 in the first direction, simultaneously causing by the assembly 150 an increase in a second distance at a bottom end of a second jaw crushing channel relative to a second roller 140B.

The method 600 may include during a second toggle cycle, causing the toggle mechanism 170 to move the center block assembly 172; and causing the center block assembly 172, during the second toggle cycle, to, from the starting location, move the center block assembly toward a second roller 140B of a second jaw crushing channel, reach an end of the second direction, and subsequently return to the starting location.

The method 600 may include, as the toggle mechanism 170 moves the assembly in the second direction, causing the assembly 150 to cause both an increase in the second distance at an upper portion of the first jaw crushing channel relative to the second roller 140B and a decrease in the second distance at a bottom end of the second jaw crushing channel relative to the second roller.

The method 600 may include, as the toggle mechanism 170 moves the assembly 150 in the second direction, simultaneously causing by the assembly 150 an increase in the first distance at a bottom end of the first jaw crushing channel relative to the first roller 140A.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed is:

1. A crusher device comprising:

a jaw having a center block assembly with a first crushing jaw having surface on a first vertical side and a second crushing jaw having a surface on a second vertical side of the center block assembly, wherein the center block assembly further comprises diametrically-opposing arcuate plate surfaces at the first crushing jaw surface and at the second crushing jaw surface, and wherein the center block assembly comprises a quasi-X shape with lateral sides that connect to the diametrically-opposing arcuate plate surfaces and at least one diametrically-opposing medial surface;

a first dual non-overlapping crushing roller mounted in space relation from the diametrically-opposing arcuate plate surface at the first crushing jaw surface;

a second dual non-overlapping crushing roller mounted in space relation from the diametrically-opposing arcuate plate surface at the second crushing jaw surface; and a toggle mechanism coupled to the center block assembly to create a toggling motion during a toggle cycle to move the center block assembly, which causes the center block assembly to, from a starting location, move in a first direction toward the first dual non-overlapping crushing roller, reach an end of the first direction, and subsequently return to the starting location by moving in a second direction.

2. The crusher device according to claim 1, wherein the jaw and the first dual non-overlapping crushing roller together form a first roller and arcuate plate surface (R&APS) pair having a first distance therebetween to form a first jaw crushing channel and the jaw and the second dual non-overlapping crushing roller together form a second roller and arcuate plate surface (R&APS) pair having a second distance therebetween to form a second jaw crushing channel.

3. A crusher device comprising:

a hopper having an inlet and two outlets;

a jaw having dual-crushing channels having a first crushing jaw and a second crushing jaw in space relation fed by the hopper, the jaw including diametrically-opposing arcuate plate surfaces;

dual non-overlapping crushing rollers mounted in space relation from the diametrically-opposing arcuate plate surfaces that together form a first roller and arcuate plate surface (R&APS) pair having a first distance therebetween to form a first jaw crushing channel and a second roller and arcuate plate surface (R&APS) pair having a second distance therebetween to form a second jaw crushing channel;

a center block assembly having a quasi-X shape including lateral sides that provide the diametrically-opposing arcuate plate surfaces and diametrically-opposing medial surfaces; and a toggle mechanism coupled to the center block assembly and has a toggling motion during a toggle cycle to move the center block assembly, which causes the center block assembly to, from a starting location, move in a first direction toward a first roller of the first jaw crushing channel, reach an end of the first direction, and subsequently return to the starting location.

4. The crusher device according to claim 3, wherein as the toggle mechanism moves the assembly in the first direction, the assembly causes both an increase in the first distance at an upper portion of the first jaw crushing channel relative to the first roller and a decrease in the first distance at a bottom end of the first jaw crushing channel relative to the first roller.

5. The crusher device according to claim 4, wherein as the toggle mechanism moves the assembly in the first direction, the assembly further to simultaneously, cause an increase in the second distance at a bottom end of the second jaw crushing channel relative to a second roller.

6. The crusher device according to claim 4, wherein the crushing rollers rotate in opposing directions.

7. The crusher device according to claim 4, wherein the toggle mechanism comprises:

an eccentric shaft wherein the shaft moves the jaw in the first direction to apply a force to a lower medial surface in proximity to the first crushing jaw as the toggle mechanism moves in the first direction.

8. The crusher device according to claim 4, further comprising a material diverter, the material diverter including:

an inverted V-shaped member sloped to the first and second outlets;

a rotating shaft; and a divider feed plate coupled to the rotating shaft, wherein rotating of the divider feed plate controls a flow of one or more materials to one of the first outlet and the second outlet.

9. The crusher device according to claim 3, further comprising:

feed channels between the outlets of the hopper and the dual-crushing jaws, each feed channel including a feed plate sloped in a direction toward an opening of each of the first and second crushing jaws.

10. The crusher device according to claim 3, wherein:

the first distance of the first roller and arcuate plate surface (R&APS) pair varies along an arc of the first jaw crushing channel; and the second distance of the second roller and arcuate plate surface (R&APS) pair tapers along an arc of the second jaw crushing channel.

11. The crusher device according to claim 3, wherein the dual crushing jaw comprises:

a rotatable center shaft;

a plurality of support crossbars; and a plurality of quasi-X shaped baffles arranged in stacked relation along the center shaft, wherein:

a first lateral side of the plurality of quasi-X shaped baffles are joined together by a first arcuate plate surface of the diametrically-opposing arcuate plate surfaces, a second lateral side of the plurality of quasi-X shaped baffles are joined together by a second arcuate plate surface of the diametrically-opposing arcuate plate surfaces, and upper medial surfaces of each quasi-X shaped baffle are joined together by a corresponding one support crossbar.

12. The crusher device according to claim 11, further comprising:

a housing to house the dual-crushing jaws, the toggling center block assembly and the toggle mechanism; and a toggle pin coupled to the plurality of quasi-X shaped baffles to offset in a direction of the second crushing jaw and to the housing.

13. The crusher device according to claim 4, wherein:

the toggle cycle is a first toggle cycle; and the toggling motion during a second toggle cycle to move the center block assembly causes the center block assembly to, from the starting location, move the center block assembly in a second direction toward a second roller of the second jaw crushing channel, reach an end of the second direction, and subsequently return to the starting location.

14. The crusher device according to claim 13, wherein as the toggle mechanism moves the assembly in the second direction causes both an increase in the second distance at an upper portion of the second jaw crushing channel relative to the second roller and a decrease in the second distance at a bottom end of the second jaw crushing channel relative to the second roller.

15. The crusher device according to claim 14, wherein as the toggle mechanism moves the assembly in the second direction, the assembly further to simultaneously cause an increase in the first distance at a bottom end of the first jaw crushing channel relative to the first roller.

16. A method comprising:

providing the crusher device according to claim 4;

funneling frangible material to the hopper;

receiving the frangible material by at least one of: the first crushing jaw and the second crushing jaw, wherein each of the first jaw crushing channel and the second jaw crushing channel is fed by a respective outlet of the two outlets;

toggling the center block assembly with the diametrically-opposing arcuate plate surfaces over the toggle cycle; and causing the toggling motion of the toggle mechanism to move the center block assembly, which causes the center block assembly to, from the starting location, move in the first direction toward the first roller of the first crushing jaw channel, reach the end of the first direction, and subsequently return to the starting location during the toggle cycle.

17. The method according to claim 16, further comprising causing the assembly both an increase in the first distance at an upper portion of the first jaw crushing channel relative to the first roller and a decrease in the first distance at a bottom end of the first jaw crushing channel relative to the first roller during the toggle cycle as the toggle mechanism moves the assembly in the first direction.

18. The method according to claim 17, further comprising simultaneously causing the assembly an increase in the second distance at a bottom end of the second jaw crushing channel relative to a second roller during the toggle cycle as the toggle mechanism moves the assembly in the first direction.

19. The method of claim 16, further comprising both an increase in the second distance at an upper portion of the second jaw crushing channel relative to a second roller and a decrease in the second distance at a bottom end of the second jaw crushing channel relative to the second roller as the toggle mechanism moves the assembly in a second direction.

* * * * *